(12) United States Patent
Hendrix et al.

(10) Patent No.: US 9,803,748 B2
(45) Date of Patent: Oct. 31, 2017

(54) HYDRAULIC ARRANGEMENT FOR SUPPLYING A CONSUMER

(71) Applicant: Robert Bosch GmbH, Stuttgart (DE)

(72) Inventors: Gottfried Hendrix, Gemuenden (DE); Hermann Mehling, Karlstadt-Stetten (DE); Albert Koeckemann, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 304 days.

(21) Appl. No.: 14/462,287

(22) Filed: Aug. 18, 2014

(65) Prior Publication Data

US 2015/0047333 A1 Feb. 19, 2015

(30) Foreign Application Priority Data

Aug. 19, 2013 (DE) .......... 10 2013 216 340
Jul. 9, 2014 (DE) .......... 10 2014 213 264

(51) Int. Cl.
*F16H 61/4096* (2010.01)
*F16H 61/4008* (2010.01)
*F16H 61/4061* (2010.01)
*F15B 1/02* (2006.01)
*F15B 11/042* (2006.01)

(52) U.S. Cl.
CPC ......... *F16H 61/4096* (2013.01); *F15B 1/024* (2013.01); *F15B 11/0426* (2013.01); *F16H 61/4008* (2013.01); *F16H 61/4061* (2013.01); *F15B 2211/20515* (2013.01); *F15B 2211/20538* (2013.01); *F15B 2211/212* (2013.01); *F15B 2211/30565* (2013.01); *F15B 2211/328* (2013.01); *F15B 2211/40592* (2013.01); *F15B 2211/427* (2013.01); *F15B 2211/6336* (2013.01); *F15B 2211/665* (2013.01); *F15B 2211/7656* (2013.01)

(58) Field of Classification Search
CPC .............. F15B 1/024; F15B 11/0426; F15B 2211/20515; F15B 2211/20538; F15B 2211/212; F15B 2211/30565; F15B 2211/328; F15B 2211/40592; F15B 2211/427; F15B 2211/6336; F15B 2211/665; F15B 2211/7656; F16H 61/4008; F16H 61/4061; F16H 61/4096
USPC .......................................... 60/413, 417, 418
See application file for complete search history.

(56) References Cited

U.S. PATENT DOCUMENTS

| | | | | |
|---|---|---|---|---|
| 4,635,439 A | * | 1/1987 | Wible | B62D 5/07 60/420 |
| 5,634,334 A | * | 6/1997 | Hehl | B29C 45/82 60/328 |
| 6,305,419 B1 | * | 10/2001 | Krieger | E02F 9/2221 137/565.16 |

(Continued)

FOREIGN PATENT DOCUMENTS

| | | | |
|---|---|---|---|
| DE | 10 2011 120 767 A1 | 6/2013 | |
| SE | WO 2012161628 A1 * | 11/2012 | ............ E02F 9/2217 |

*Primary Examiner* — Logan Kraft
(74) *Attorney, Agent, or Firm* — Maginot, Moore & Beck LLP (57) ABSTRACT

A hydraulic arrangement for supplying a consumer or actuator includes a first supply device that has at least one pump with an adjustable delivery volume. The hydraulic arrangement further includes a second supply device that is connected in parallel to the first supply device. The second supply device includes a loadable accumulator and a digitally regulated switching valve arrangement.

19 Claims, 4 Drawing Sheets

(56) References Cited

U.S. PATENT DOCUMENTS

| | | | | |
|---|---|---|---|---|
| 6,357,230 B1* | 3/2002 | A'Hearn | ............... | E02F 9/2217 60/413 |
| 6,942,055 B2* | 9/2005 | Forsyth | ................. | B60K 17/34 180/249 |
| 7,444,809 B2* | 11/2008 | Smith | .................. | E02F 9/2217 60/413 |
| 7,905,088 B2* | 3/2011 | Stephenson | ........... | E02F 9/2217 60/414 |
| 8,235,473 B2* | 8/2012 | Hinz | ....................... | B60T 8/261 303/137 |
| 2005/0072144 A1* | 4/2005 | Bitter | ..................... | F15B 1/021 60/413 |
| 2012/0046694 A1* | 2/2012 | Miller | .................. | A61H 1/008 606/239 |
| 2014/0123633 A1* | 5/2014 | Rosth | .................. | E02F 9/2217 60/327 |

* cited by examiner

HYDRAULIC ARRANGEMENT FOR SUPPLYING A CONSUMER

This application claims priority under 35 U.S.C. §119 to patent application nos. DE 10 2013 216 340.1, filed on Aug. 19, 2013 in Germany, and DE 10 2014 213 264.9, filed on Jul. 9, 2014 in Germany, the disclosures of which are incorporated herein by reference in their entirety.

BACKGROUND

The disclosure relates to a hydraulic arrangement for supplying a consumer or actuator.

According to the prior art, pumps with an adjustable delivery volume, inter alia, are used to supply a consumer (for example, cylinder or motor), the speed of which (for example, movement or rotational speed) is to be capable of being controlled or regulated. Here, a first basic principle is known, in which the rotational speed of a fixed displacement pump can be changed via an electric motor which can be regulated. According to a second basic principle, the delivery volume of a constantly driven variable displacement pump is changed via its adjusting device. Here, its geometric displacement volume is changed. For example, the stroke of its pistons is changed, which stroke said pistons perform during one revolution of its rotor. The consumer can be moved at different speeds (in the case of both basic principles) via the different delivery volumes.

Document DE 10 2011 120 767 A1 has disclosed a hydraulic arrangement for supplying a differential cylinder which can be operated bi-directionally and correspondingly has two working connectors which can both be connected to a pump and to a tank. The pump has an adjustable delivery volume. Furthermore, the arrangement has a switching valve for each of the four main lines. The four main lines result from the fact that the pump can be connected to the two working connectors and the two working connectors can be connected to the tank. The actuation of the four switching valves takes place by way of pulse width modulation, that is to say by way of opening pulses which are of different lengths, or by way of opening pulses which are even shorter, in which the respective valve body does not reach its open end position before it falls back again into its closed position (ballistic behavior).

During operation of the arrangement, a decision is made by a logic circuit depending on the state and the position of the piston of the differential cylinder as to whether the pump or a switching valve of the switching valve arrangement is actuated, in order to move the piston as requested.

A disadvantage of arrangements of this type is the limited throughflow quantity which results from the series connection of the pump and the switching valves.

In contrast, the disclosure is based on the object of providing a hydraulic arrangement for supplying a consumer or actuator, in which hydraulic arrangement the energy efficiency is improved further, and in which, in particular, the maximum throughflow quantity and therefore the maximum speed of the consumer are increased.

SUMMARY

This object is achieved by way of an arrangement having the features of the disclosure.

The hydraulic arrangement serves to supply a consumer or actuator and has a first supply device which has at least one pump with an adjustable delivery volume. In this way, the consumer can be supplied, for example, in a rapid mode with a comparatively large volumetric flow. According to the disclosure, a second supply device which has a pressure source, for example an accumulator and a digitally regulated switching valve arrangement is provided in parallel to the first supply device. In this way, the consumer can be supplied, for example, in a slow or creep mode with a comparatively small volumetric flow. Both supply devices can be used separately from one another and both can act directly on the consumer.

In one development which is simple in terms of apparatus technology, the accumulator can be loaded by the pump of the first supply device.

By way of the arrangement according to the disclosure, the energy efficiency is optimized if, during operation of the consumer, rapid movements or dynamic regulations take place via the first supply device and slow movements and quasi-static regulating operations take place via the second supply device. In particular, the maximum throughflow quantity and therefore the maximum speed of the consumer are increased by way of the parallel arrangement according to the disclosure in comparison with the prior art, since, in the rapid mode, the adjustable pump of the first supply device is active and the switching valve arrangement of the second supply device is therefore bypassed.

According to a first preferred development, the switching valve arrangement consists of one or more switching valves which can be actuated ballistically and are arranged in parallel to one another. Here, the respective valve body is loaded with an opening force multiple times one after another in a comparatively short or pulse-like manner, with the result that the valve body does not reach the open end position and then falls back again into its closed position.

According to a second preferred development, the switching valve arrangement consists of one or more switching valves which are arranged parallel to one another and can be actuated with pulse width modulation. Here, the respective valve body is opened multiple times one after another in a comparatively short or pulse-like manner.

The switching valve arrangement can have a plurality of switching valves which are arranged parallel to one another and have different opening cross sections. Here, the ratio 1:2:4:8:16, etc. is preferred, whereby the graduation of the summed opening cross sections is refined and the variability of the summed opening cross sections is maximized.

In order to achieve a particularly dynamic behavior of the one switching valve or the plurality of switching valves, the second supply device can have a booster for actuating the at least one switching valve.

According to a first development of the first supply device, the pump is a variable displacement pump. According to a second development, the pump is driven by a variable speed electric motor. In the second development, the pump can be a less expensive fixed displacement pump or else a variable displacement pump. In both developments, the change of the delivery volumetric flow via the first supply device is possible in the rapid mode or in dynamic regulation.

The first supply device can be arranged in a closed circuit or in an open circuit.

If the first supply device is arranged in an open circuit, according to a first development a directional valve is particularly preferred which is arranged between the first supply device on one side and the consumer on the other side. Via the directional valve, the first supply device can be connected to a first working connector and to a second working connector of the consumer, with the result that the consumer can be operated bidirectionally. The directional valve is preferably configured as a 4/3-way switching valve of seat design.

If the first supply device is arranged in an open circuit, a directional valve is also possible which is arranged between the two supply devices on one side and the consumer on the other side. Via the directional valve, the two supply devices can be connected to a first working connector and to a second working connector of the consumer, with the result that the consumer can be operated bidirectionally. The directional valve is preferably configured as a 4/3-way valve of seat valve design.

According to a second development, a parallel connection of four 2/2-way switching valves is provided which are preferably configured as seat valves. In this way, the 4/3-way valve (of the first development) is realized in a resolved design. As a result, regenerative operation of the arrangement according to the disclosure can be achieved. Furthermore, there is satisfactory regulating behavior as a result of the loaded piston of a differential cylinder. In both developments, the opening cross sections are greater than those of the switching valve of the second supply device.

Here, the 2/2-way switching valves V1, V2, V3, V4 can be actuated ballistically in order to increase the regulating quality. To this end, comparatively small and powerful opening pulses are output to the valve, which opening pulses briefly raise up its valve body and allow it to fall back into its closed position before the complete opening position has been reached.

The 4/3-way valve can be configured as a slide valve if a leak-free shut-off means is additionally provided.

Said shut-off means can be formed by two non-return valves which can be switched passively alternately or by an actively switchable shut-off valve of seat design.

If the consumer is a differential cylinder, it is preferred if a piston head which delimits the piston head space and an annular face which delimits the annular space have a size ratio of 2:1. The force during extension is then halved, whereas the extension speed is doubled.

BRIEF DESCRIPTION OF THE DRAWINGS

In the following text, various exemplary embodiments of the disclosure will be described in detail using the figures, in which.

DETAILED DESCRIPTION

Figure 1:
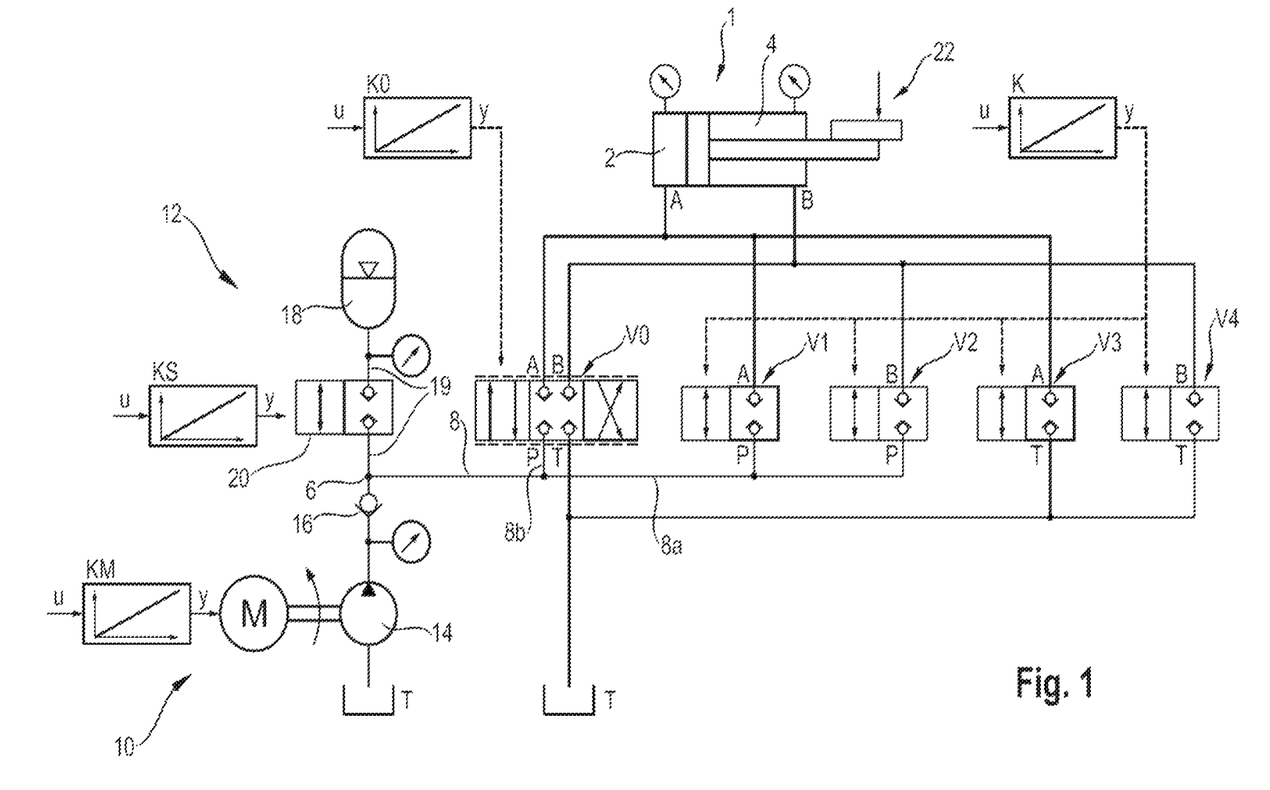
FIG. 1 shows a first exemplary embodiment of an arrangement according to the disclosure.

FIG. 1 shows a first exemplary embodiment of an arrangement according to the disclosure for supplying a differential cylinder 1. The piston head space 2 of said differential cylinder 1 is connected to a first working connector A, whereas an annular space 4 is connected to a second working connector B. Since a piston of the differential cylinder 1 can be moved in both directions via a corresponding loading with pressure medium, two inlet-side 2/2-way switching valves V1, V2 and two outlet-side 2/2-way switching valves V3, V4 are connected to the corresponding working connectors A, B of the differential cylinder 1. The two inlet-side 2/2-way switching valves V1, V2 are connected via a common feed line 8 and via a first feed line 8a to a node 6. The two outlet-side 2/2-way switching valves V3, V4 are connected to a tank T. The four 2/2-way switching valves V1, V2, V3, V4 are assigned to a first supply device 10 and are opened when the latter is activated.

In addition to the first supply device 10, a second supply device 12 is also connected to the node 6 of the arrangement. The first supply device 10 has a variable speed electric motor M which can be actuated via a characteristic curve KM. The electric motor M drives a fixed displacement pump 14 which sucks pressure medium from the tank T via an open circuit and delivers it to the node 6 via a non-return valve 16.

The second supply device 12 has an accumulator 18 which can be connected to the node 6 via an accumulator line 19, in which a 2/2-way switching valve 20 is provided. The actuation and regulation of both supply devices 10, 12 takes place via an electronic control unit (not shown). The latter controls a digital switching valve V0 which is assigned to the second supply device 12 via a booster which is symbolized in FIG. 1 by way of a rising characteristic curve K0. The switching valve V0 is configured as a 4/3-way seat valve and has a valve body which can be moved ballistically. To this end, comparatively small and powerful opening pulses are output which briefly raise up the valve body and allow it to fall back into its closed position before the complete opening position has been reached. The switching valve V0 is connected to the node 6 via the common feed line 8 and via a second feed line 8b which is assigned to the second supply device 12.

The node 6 which is supplied with pressure medium either by the fixed displacement pump 14 of the first supply device 10 or by an accumulator 18 of the second supply device 12 depending on the operating state of the differential cylinder 1 has various connections to the two working connectors A, B of the differential cylinder 1. In more precise terms, in the case of comparatively low speeds of the piston and in the case of regulation tasks with low volumetric flow requirements, a connection to one of the two working connectors A, B is opened via the switching valve V0 of the second supply device 12, whereas the other of the two working connectors A, B is relieved to the tank T via the switching valve V0. The actuation of the switching valve V0 takes place via the control unit (not shown) with consideration of a characteristic curve K0 for the switching valve V0.

In the case of greater throughflows, the 2/2-way switching valves V1, V2, V3, V4 of the first supply device 10 are used. Depending on the movement direction of the piston of the differential cylinder 1, either the switching valves V1 and V4 or the switching valves V2 and V3 are opened. This likewise takes place via the control unit (not shown) with consideration of a characteristic curve K for the switching valves V1, V2, V3, V4. The opening cross sections which are released by the switching valves V1 to V4 are greater than those of the switching valve V0.

In order to actuate the first supply device 10 or the second supply device 12 and in order to actuate the switching valve V0 and the 2/2-way switching valves V1, V2, V3, V4, the control unit (not shown) firstly evaluates the current position of the piston of the differential cylinder 1, which position is determined via a position sensor 22. Furthermore, the control unit evaluates the predefined target position and the desired or required speed of the piston.

Figure 2:
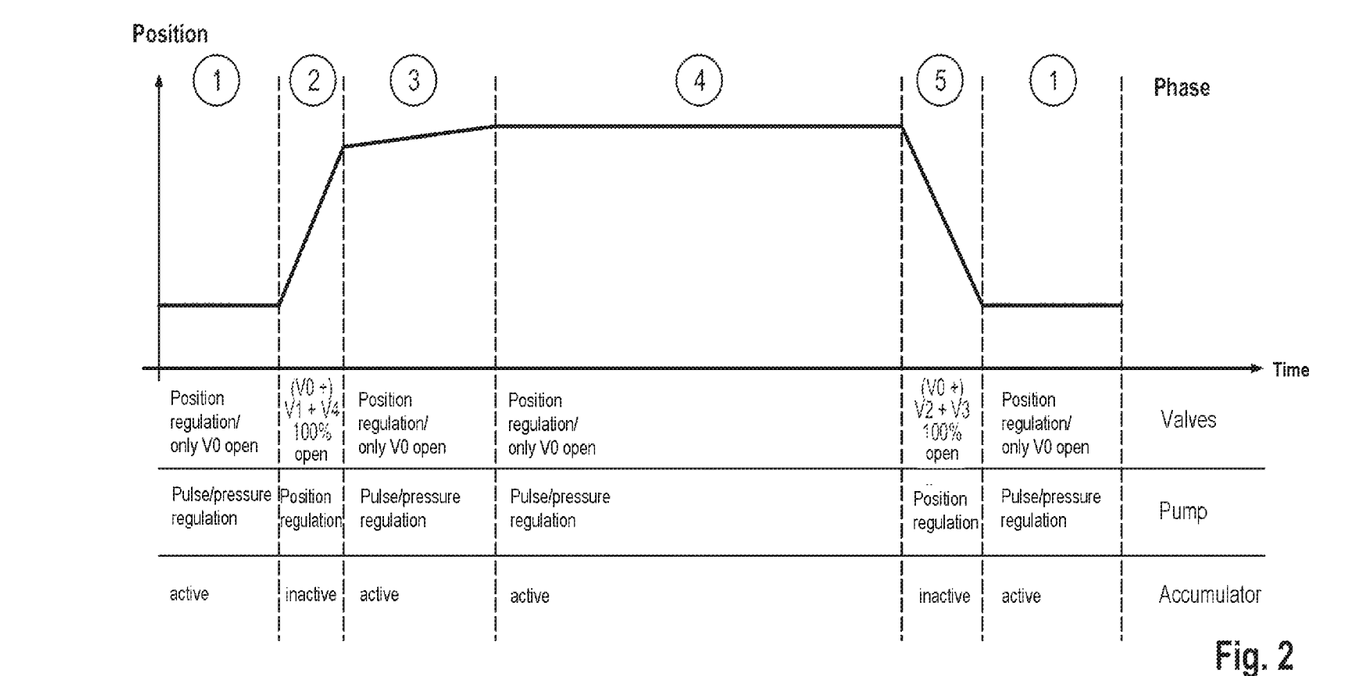
FIG. 2 shows a diagram with various phases of regulation of the first exemplary embodiment of the arrangement.

FIG. 2 shows a diagram with exemplary phases of regulation of the first exemplary embodiment of the arrangement according to FIG. 1. Here, the position of the piston is shown against time and this profile is divided into various phases:

in phase 1, a quasi-static position regulation of the piston is required. Here, the digital switching valve V0 is in engagement, and the second supply device 12 moves the piston of the differential cylinder 1 in the corresponding direction depending on the switching position of the switching valve V0. Here, the accumulator 18 is active, by the 2/2-way switching valve 20 opening and making the supply of the differential cylinder 1 with small quantities possible. In phase 2, the piston is to be moved comparatively rapidly to a target position. To this end, the two 2/2-way switching valves V1 and V4 are opened. The first supply device 10 assumes the position regulation. Here, the accumulator 18 is switched to inactive via the switching valve 20. In phase 3, an approach to the target position takes place (creep). To this end, the two switching valves V1 and V4 which are provided for greater throughflow quantities are closed again and the second supply device 12 assumes the supply with a small quantity of pressure medium from the accumulator 18 which is now active again. In phase 4 (a pressure regulation), the supply and the regulation of the differential cylinder 1 takes place by way of the second supply device 12, as in phase 3. In phase 5, in a comparable manner to phase 2, the starting position is to be moved to comparatively rapidly. To this end, the switching valves V2 and V3 are opened. In this way, comparatively great volumetric flows can flow again. The accumulator 18 or the second supply device 12 is switched to inactive, by the switching valve 20 being closed. The first supply device 10 assumes the position regulation.

In one advantageous development of the arrangement, in addition to the switching valves V1 and V4 or V2 and V3, the switching valve V0 is also actuated in order to extend the volumetric flow which can be set; as a result, the opening cross sections which act in the direction of the consumer are increased, and a greater volumetric flow can therefore be set by way of the installed components.

Figure 3:
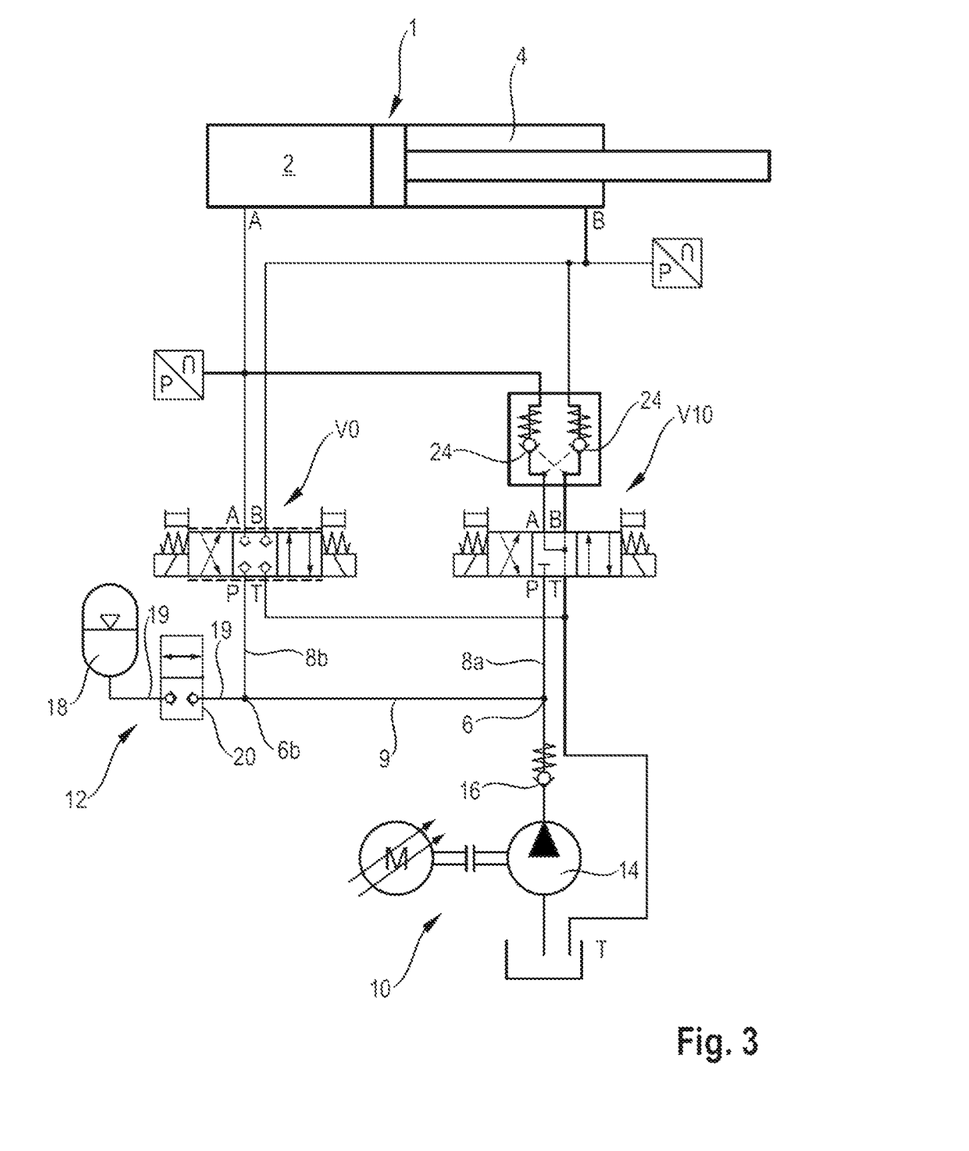
FIG. 3 shows a second exemplary embodiment of the arrangement according to the disclosure.

FIG. 3 shows a second exemplary embodiment of the arrangement according to the disclosure. Here, only the differences from the first exemplary embodiment according to FIG. 1 will be explained in the following text. In order to supply the differential cylinder 1 with comparatively great volumetric flows, a 4/3-way valve V10 which is configured as a slide valve and serves as a directional valve is provided in parallel to the digital switching valve V0, which 4/3-way valve V10 is assigned to the first supply apparatus 10. It has two working connectors A, B which are connected to the corresponding working connectors A, B of the differential cylinder 1. Furthermore, the directional valve V10 has an inlet connector P, to which the node 6 is connected via the first feed line 8a. Finally, the directional valve V10 has a tank connector T, to which a tank T is connected. In the basic position which is centered by spring and is shown in FIG. 3, the two working connectors A, B of the differential cylinder 1 and the two working connectors A, B of the directional valve V10 are connected to one another and are relieved to the tank T. The inlet connector P of the directional valve V10 is shut off. If the piston of the differential cylinder 1 is to be moved comparatively rapidly, the directional valve V10 is switched into the switching position which corresponds to the direction of movement. Two non-return valves 24 which can be opened hydraulically are provided additionally for leak-free sealing. In more precise terms, in each case one non-return valve 24 which is prestressed by way of a spring and the opening direction of which is directed from the directional valve V10 to the differential cylinder 1 is provided in the two working lines which connect the respective working connector A, B of the directional valve V10 to the respective working connector A, B of the differential cylinder 1. The two non-return valves 24 are opened in the opposite direction, that is to say from the differential cylinder 1 to the tank T, via a respective control line if high pressure prevails in the other working line.

After the pressure of the accumulator 18 has dropped below a predefined value on account of quasi-static regulation operations via the second supply device 12, the directional valve V10 and the switching valve V0 are closed, while the switching valve 20 is opened. The fixed displacement pump 14 is then driven and the accumulator 18 is filled up, until it has reached a predefined pressure. To this end, the pressure medium flows from the fixed displacement pump 14 via the common node 6, a loading line 9, a node 6b which is assigned to the second supply device 12, and the accumulator line 19 into the accumulator 18.

Figure 4:
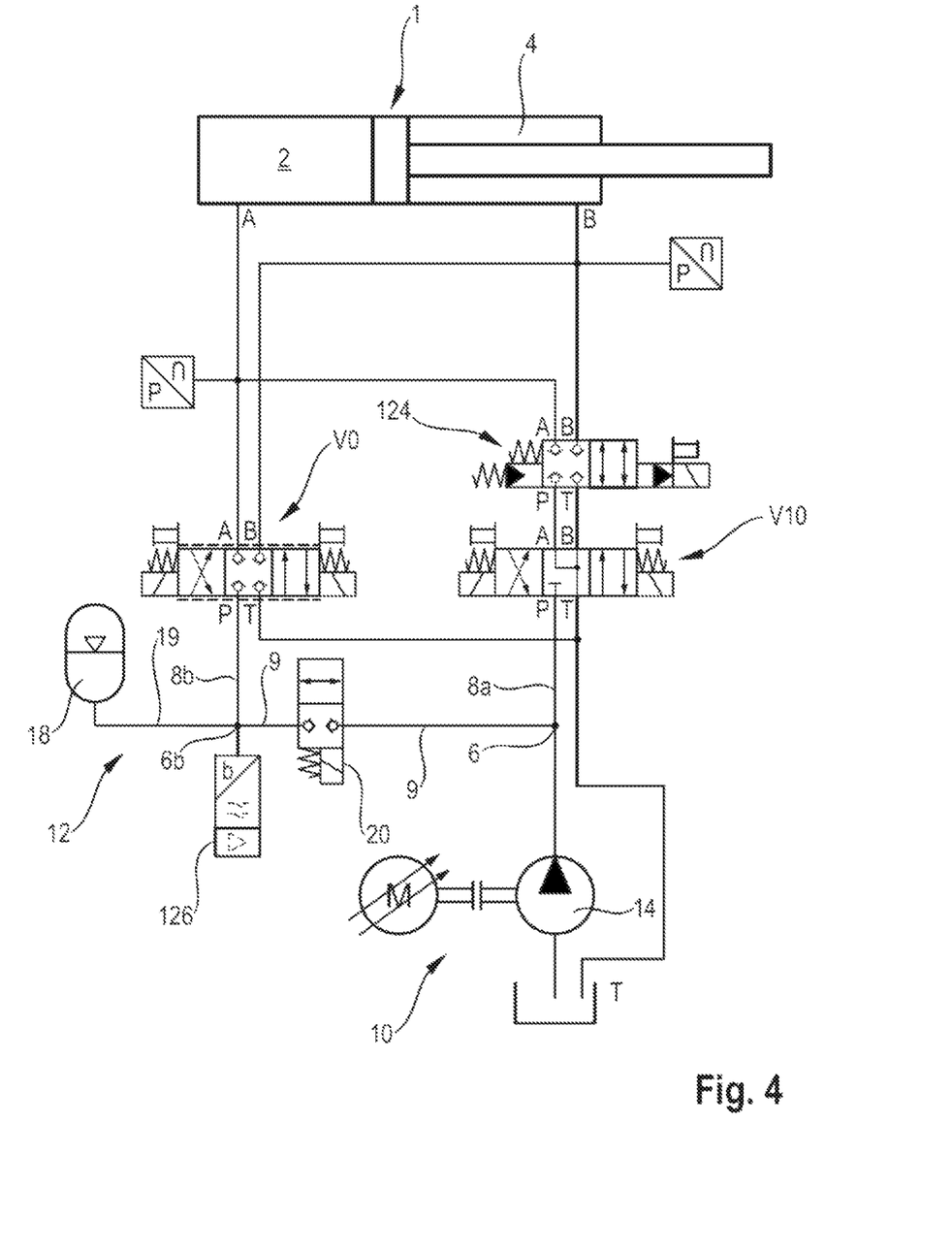
FIG. 4 shows a third exemplary embodiment of the arrangement according to the disclosure.

FIG. 4 shows a third exemplary embodiment of the arrangement according to the disclosure, which third exemplary embodiment corresponds largely to the second exemplary embodiment according to FIG. 3. Here, a pressure switch 126 is connected at the node 6b of the second supply device 12, which pressure switch 126 assumes the pressure monitoring of the accumulator 18 which was described in the last paragraph (in relation to FIG. 3). The 2/2-way switching valve 20 is arranged in the loading line 9 which connects the node 6b of the second supply device 12 to the common node 6. The 2/2-way switching valve 20 is opened when the accumulator 18 is to be loaded by the fixed displacement pump 14. Furthermore, it serves to disconnect the two supply devices 10, 12 as required.

A shut-off valve 124 which is configured as a 4/2-way switching valve of seat design is provided in the two working lines, via which the directional valve V10 is connected to the two working connectors A, B of the differential cylinder 1. In a spring-prestressed basic position, it separates the differential cylinder 1 from the 4/3-way valve V10 which is configured as a slide valve and serves as a directional valve, with the result that the piston of the differential cylinder 1 can be held without leakage of the directional valve V10. In this way, the second supply apparatus 12 can carry out the quasi-static position regulation in an optimum and energy-efficient manner.

A hydraulic arrangement is disclosed having a differential cylinder which can be supplied firstly via a pump with a delivery volume which can be regulated and secondly by way of an accumulator which can be loaded by the pump and is arranged in parallel and a digitally regulated switching valve arrangement. The switching valves can be actuated ballistically and/or by pulse width modulation. Apart from occasional reloading of the accumulator by way of the pump, the pump and the accumulator can be used separately from one another and can both act directly on the differential cylinder. In this way, the differential cylinder can be supplied with a comparatively great volumetric flow in a rapid mode. In a creep mode and in a pressure-holding mode, the differential cylinder can be supplied with a comparatively small volumetric flow by the accumulator via the switching valve.

LIST OF REFERENCE NUMERALS

1 Differential cylinder
2 Piston head space
4 Annular space
6, 6b Node
8 Feed line
8a First feed line
8b Second feed line 9 Loading line
10 First supply device
12 Second supply device
14 Fixed displacement pump
16 Non-return valve
18 Accumulator
19 Accumulator line
20 2/2-way switching valve
22 Position sensor
24 Non-return valve
124 Shut-off valve
126 Pressure switch
A First working connector
B Second working connector
K Characteristic curve for switching valves
KM Characteristic curve for motor
K0 Characteristic curve for switching valve
KS Characteristic curve
M Electric motor
P Pump connector/inlet connector
V0 Digital switching valve
V1 2/2-way switching valve
V2 2/2-way switching valve
V3 2/2-way switching valve
V4 2/2-way switching valve
V10 4/3-way valve
T Tank connector/tank

What is claimed is:

1. A hydraulic arrangement for supplying a consumer, comprising:
    a first supply device including a pump and at least one directional control valve connected in series with the pump, the first supply device having a first adjustable delivery volume and being configured to deliver the first adjustable delivery volume to at least one port of the consumer;
    a second supply device including an accumulator and a digitally regulated switching valve arrangement connected in series between the accumulator and the at least one port, the digitally regulated switching valve arrangement configured to be actuated at least one of ballistically and via pulse width modulation in such a way that the second supply device delivers a second adjustable delivery volume to the at least one port of the consumer,
    wherein, in a first operating mode, the first supply device is configured to supply the first adjustable delivery volume to the at least one port and the second supply device is inactive, and in a second operating mode the second supply device is configured to supply the second adjustable delivery volume to the at least one port and the first supply device is inactive, and
    wherein the pump and the accumulator are both configured to deliver fluid to a common node that is upstream of both the at least one directional control valve and the digitally regulated switching valve arrangement.

2. The hydraulic arrangement according to claim 1, wherein the accumulator is configured to be loaded by the pump.

3. The hydraulic arrangement according to claim 1, further comprising:
    an electronic control unit configured to operate the pump, actuate the at least one directional control valve, and actuate the digitally regulated switching valve arrangement.

4. The hydraulic arrangement according to claim 1, wherein the digitally regulated switching valve arrangement includes at least one 2/2-way switching valve.

5. The hydraulic arrangement according to claim 1, wherein the pump is a fixed displacement pump driven by a variable speed electric motor.

6. The hydraulic arrangement according to claim 1, wherein the first supply device is arranged in an open circuit.

7. The hydraulic arrangement according to claim 6, wherein:
    the at least one port includes a first working connector and a second working connector,
    the at least one directional control valve includes four 2/2-way switching valves arranged in parallel to the digitally regulated switching valve arrangement, the four 2/2-way switching valves each having respective maximum opening cross sections that are greater than a maximum opening cross-section of the digitally regulated switching valve arrangement,
    a first 2/2-way switching valve of the four 2/2-way switching valves is configured to selectively connect the pump to the first working connector,
    a second 2/2-way switching valve of the four 2/2-way switching valves is configured to selectively connect the pump to the second working connector,
    a third 2/2-way switching valve of the four 2/2-way switching valves is configured to selectively connect the first working connector to a tank, and
    a fourth 2/2-way switching valve of the four 2/2-way switching valves is configured to selectively connect the second working connector to the tank.

8. The hydraulic arrangement according to claim 7, wherein the four 2/2-way switching valves are configured as seat valves.

9. The hydraulic arrangement according to claim 7, wherein the four 2/2-way switching valves are configured to be actuated ballistically.

10. The hydraulic arrangement according to claim 1, wherein:
    the at least one port includes a first working connector and a second working connector, and
    the at least one directional control valve comprises a first 4/3-way directional switching valve via which the pump is configured to be selectively connected to the first working connector or to the second working connector.

11. The hydraulic arrangement according to claim 10, wherein the digitally regulated switching valve arrangement comprises a second 4/3-way directional switching valve via which the pump and the accumulator are configured to be selectively connected to the first working connector or to the second working connector.

12. The hydraulic arrangement according to claim 11, wherein the pump and the accumulator are connected jointly to a first inlet connector of the first 4/3-way directional switching valve and to a second inlet connector of the second 4/3-way directional switching valve.

13. The hydraulic arrangement according to claim 11, wherein the first 4/3-way directional switching valve has a first maximum opening cross section that is greater than a second maximum opening cross section of the second 4/3-way directional switching valve.

14. The hydraulic arrangement according to claim 13, further comprising a switchable leak-free shut-off device arranged between the first 4/3-way directional switching valve and the working connectors of the consumer, wherein:

the first 4/3-way directional switching valve is configured as a slide valve, the shut-off device has passively switchable non-return valves including:
- a first non-return valve positioned in a first line between the first 4/3-way directional switching valve and the first working connector and configured to open to enable flow from the first 4/3-way directional switching valve to the first working connector; and
- a second non-return valve positioned in a second line between the first 4/3-way directional switching valve and the second working connector and configured to open to enable flow from the first 4/3-way directional switching valve to the second working connector, the first non-return valve includes a first control line connected to the second line and configured such that the first non-return valve is opened to enable flow from the first working connector to the first 4/3-way directional switching valve when the second line has high pressure, and the second non-return valve includes a second control line connected to the first line and configured such that the second non-return valve is opened to enable flow from the second working connector to the first 4/3-way directional switching valve when the first line has high pressure.

15. The hydraulic arrangement according to claim 10, wherein the consumer is configured as a differential cylinder having a piston head space and an annular space, the piston head space being connected to the first working connector and the annular space being connected to the second working connector.

16. A hydraulic arrangement for supplying a consumer, comprising:
- a first supply device including a pump and at least one directional control valve connected in series with the pump, the first supply device having a first adjustable delivery volume and being configured to deliver the first adjustable delivery volume to at least one port of the consumer;
- a second supply device including an accumulator and a digitally regulated switching valve arrangement connected in series between the accumulator and the at least one port and configured to deliver a second adjustable delivery volume to the at least one port;
- an electronic control unit operably connected to the pump, the at least one directional control valve, and the digitally regulated switching valve arrangement, the electronic control unit configured, in a first operating mode, to operate the pump and the at least one directional control valve to deliver the first adjustable delivery volume to the at least one port while the second supply device is inactive, and, in a second operating mode, to operate the digitally regulated switching valve arrangement one of ballistically and via pulse width modulation to set the second adjustable delivery volume while the first supply device is inactive, and wherein the pump and the accumulator are both configured to deliver fluid to a common node that is upstream of both the at least one directional control valve and the digitally regulated switching valve arrangement.

17. The hydraulic arrangement according to claim 16, wherein, in the first operating mode, the electronic control unit is configured to operate one or more of the at least one directional control valves to a fully open position, and to operate the pump to set the first adjustable delivery volume.

18. The hydraulic arrangement according to claim 16, the second supply device further comprising:
- a further switching valve positioned between the accumulator and the digitally regulated switching valve arrangement,
- wherein the electronic control unit is operably connected to the further switching valve and is configured to operate the further switching valve to close in the first operating mode to deactivate the second supply device, and to open in the second operating mode to activate the second supply device.

19. A hydraulic arrangement for supplying a consumer, comprising:
- a first supply device including a pump and at least one directional control valve connected in series with the pump, the first supply device having a first adjustable delivery volume and being configured to deliver the first adjustable delivery volume to at least one port of the consumer;
- a second supply device including an accumulator and a digitally regulated switching valve arrangement connected in series between the accumulator and the at least one port and configured to deliver a second adjustable delivery volume to the at least one port;
- an electronic control unit operably connected to the pump, the at least one directional control valve, and the digitally regulated switching valve arrangement, the electronic control unit configured, in a first operating mode, to operate the pump and the at least one directional control valve to deliver the first adjustable delivery volume to the at least one port while the second supply device is inactive, and, in a second operating mode, to operate the digitally regulated switching valve arrangement one of ballistically and via pulse width modulation to set the second adjustable delivery volume while the first supply device is inactive, wherein, in the first operating mode, the electronic control unit is configured to operate one or more of the at least one directional control valves to a fully open position, to operate the pump to set the first adjustable delivery volume, and to operate the digitally regulated switching valve arrangement to a fully open position such that the first adjustable delivery volume is delivered through both the digitally regulated switching valve arrangement and the one or more of the at least one directional control valves to the at least one port.

* * * * *